United States Patent
Zahr

(10) Patent No.: US 6,274,697 B1
(45) Date of Patent: Aug. 14, 2001

(54) PROCESS AND PRODUCT FOR MAKING POLYAMIDES

(75) Inventor: George Elias Zahr, Glen Mills, PA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/469,810

(22) Filed: Dec. 22, 1999

Related U.S. Application Data

(63) Continuation-in-part of application No. 09/165,468, filed on Oct. 2, 1998, now abandoned.

(51) Int. Cl.$^7$ .......................... C08G 69/28; C08G 73/10; C08G 69/40; C08L 77/00
(52) U.S. Cl. .................. 528/310; 528/323; 528/324; 528/332; 528/335; 528/345; 525/420; 525/432
(58) Field of Search ................... 528/310, 332, 528/323, 324, 335, 345; 525/420, 432

(56) References Cited

U.S. PATENT DOCUMENTS

| | | | |
|---|---|---|---|
| 3,846,507 | 11/1974 | Thomm et al. | 260/857 TW |
| 3,962,159 | 6/1976 | Ray-Chaudhuri et al. | 260/17.4 |
| 4,365,041 | * 12/1982 | Okamoto et al. | 525/58 |
| 4,578,454 | 3/1986 | Cantatore | 528/327 |
| 4,894,422 | 1/1990 | Peiffer et al. | 525/420 |
| 5,108,684 | * 4/1992 | Anton et al. | 264/176.1 |
| 5,155,178 | 10/1992 | Windley | 525/432 |
| 5,175,038 | 12/1992 | Tung et al. | 428/92 |
| 5,223,196 | 6/1993 | Shridharani et al. | 260/17.4 |
| 5,422,420 | * 6/1995 | Shridarani | 528/349 |
| 5,830,572 | * 11/1998 | Anton et al. | 428/372 |

FOREIGN PATENT DOCUMENTS

| | | | |
|---|---|---|---|
| 0 222 501 | 1/1981 | (EP) | C08G/69/02 |
| 0 381 354 | 8/1990 | (EP) | C08F/299/02 |
| 0 505 031 | 9/1992 | (EP) | C08G/69/48 |
| 1 085 666 | 10/1967 | (GB) | C08G/19/00 |
| 1 090 893 | 11/1967 | (GB) | C08G/19/00 |

OTHER PUBLICATIONS

Suzuki et al., "Homogeneous Alkylation of Poly(M–Phenylene Isophthalamide)", *Polymer Engineering and Science*, 36(10), 1410–1413, May 1996.

* cited by examiner

*Primary Examiner*—P. Hampton-Hightower

(57) ABSTRACT

Disclosed is a process for modifying polyamide polymers by attaching a substituted or unsubstituted 2-hydroxy-ethyl modifying group to the amide nitrogen atoms and the modified product formed. The process comprises contacting an epoxy containing molecule with diamine/diacid salt and/or an amino-acid of a hydrolyzed lactam or lactam to form a modified polyamide.

24 Claims, No Drawings

PROCESS AND PRODUCT FOR MAKING POLYAMIDES

This is a continuation-in-part of application Ser. No. 09/165,468 filed Oct. 2, 1998, now abandoned.

FIELD OF THE INVENTION

Disclosed in the present invention is a process for modifying a polyamide polymer comprising contacting an epoxy containing molecule with diamine/diacid salt and/or an amino-acid of a hydrolyzed lactam or lactam to form a modified polyamide. A second embodiment of the present invention is a process for modifying a polyamide polymer comprising contacting an epoxy containing molecule with diamine then contacting the resulting modified diamine with diacid and/or lactam to form a modified polyamide.

Many of the products produced have higher viscosity, more end groups, improved characteristics such as enhanced dyeing and higher moisture absorption, and enhanced adhesion to other substrates.

TECHNICAL BACKGROUND

U.S. Pat. No. 5,175,038 relates to a highly bulked continuous filament yarns, comprised of filaments having a denier per filament of 10–25 and a trilobal filament cross section of modification ratio 1.4–4.0, including filament nylon yarns that have a yarn bulk level of at least 35, which can be ply-twisted together to high-twist levels and can be used in carpets at high-twist levels.

U.S. Pat. No. 3,962,159 discloses graft copolymers prepared by condensing a polyamideamine substrate with starch and a condensing reagent.

SUMMARY OF THE INVENTION

Disclosed in the present invention is a process for modifying a polyamide polymer comprising contacting an epoxy containing molecule with diamine/diacid salt and/or an amino-acid of a hydrolyzed lactam or lactam to form a modified polyamide.

A second embodiment of the invention is a process for modifying a polyamide polymer comprising contacting an epoxy containing molecule with diamine then contacting the resulting modified diamine with diacid and/or lactam to form a modified polyamide.

An example of a lactam that may be hydrolyzed in the present invention is caprolactam, commonly used in the manufacture of nylon 6.

Also disclosed is a polyamide having a substituted or unsubstituted 2-hydroxy-ethyl modifier group pendant from the amide nitrogen.

DESCRIPTION OF THE INVENTION

The production of aliphatic and aromatic polyamides, particularly nylons including nylon 6, nylon 6,6 and their copolymers, is well known. These polymers contain amide, acid and amine groups, which can be substituted with moieties which can modify the properties, such as dyeability, tensile strength, catalytic activity, and the like. See generally U.S. Pat. Nos. 5,422,420, 5,223,196, 3,389, 549, which are incorporated herein by reference. See also Kirk Othmer Encyclopedia of Chemical Technology, 4th ed., 1996, Vol. 19, pp. 454–518, and Ullmann's Encyclopedia of Industrial Chemistry, 1992, Vol. A21, pp. 190–191.

The present invention allows the production of modified aliphatic and aromatic polyamides and other amide-, amine- or carboxylic acid-containing polymers and copolymers, particularly nylons and aramids, including but not limited to nylon 6, nylon 6,6, Kevlar® and Nomex®, in a new way that is not currently available. For example, the pendant substituted or unsubstituted 2-hydroxy-ethyl can act as a branch site on the nylon chain by reacting with a terminal acid group in a another polymer chain to form an ester branch linkage. This produces higher viscosity in shorter reaction time and accelerates autoclave polymerization, continuous polymerization and solid phase polymerization, which are practiced with polyamides. In general, the present improvement can be used with any process useful for making polyamides and other polymers, as described in the background above, including batch and continuous polymerization processes. No equipment modification is generally necessary, as additional ports on evaporators, transfer lines and autoclaves are generally available for addition of process and product property control additives. Additives include, but are not limited to, antifoam agents, antioxidants, delusterants, antistatic agents, branching agents and the like.

The modifying process of the present invention comprises, contacting a primary terminal amine group on a monomer or polymer/oligomer molecule with an epoxy containing molecule producing a produce referred to herein as "modified amine", then contacting the modified amine with diacid or a terminal acid group in a polymer/oligomer chain, additional diamine, diacid and/or lactams, to form a polyamide polymer with 2-hydroxy-ethyl (substituted or unsubstituted) groups pendant on a portion of the amide nitrogens, or a substituted terminal group on the polymer chain.

Typically, in a nylon 6,6 process, hexamethylenediammonium adipate salt (approximately 52% by weight in water) is added to an evaporator. Various additives may be added at this stage. Under inert atmosphere, this reaction mixture is then heated to a boil (about 160° C.) under slight pressure to remove the excess water and thus increase its concentration. A slight pressure is desirable to minimize the loss of volatile materials like hexamethylenediamine. Upon reaching the desired concentration, typically in the range of 70–90% by weight, the reaction mixture is transferred through a transfer line to an autoclave, which is a high pressure reactor. The reaction mixture is maintained under an oxygen-free atmosphere to avoid undesirable side reactions such as oxidative degradation. While in the autoclave, the reaction mixture is heated to a temperature between about 175° C. and about 200° C., while increasing the pressure to about 300 psia to again minimize loss of volatile organic compounds. Oligomers are formed during this stage, which generally takes about an hour. The temperature is then increased to between about 250° C. and 310° C., and the pressure is released at a slow rate to bleed off steam and thus drive the condensation reaction towards polymerization. While maintaining approximately the same temperature, the reaction mixture is held at a low constant pressure for sufficient time to obtain the desired extent of reaction. The polyamide is then extruded from the reaction vessel and conveniently chopped and dried to produce flake. The relative viscosity (RV) from the autoclave of both nylon 6,6 homopolymer and the inventive material can be in the range of 15 to 80, but is generally between 20 and 55.

The polyamide flake thus produced can be spun at the RV at which it is produced, or it can be further polymerized to a higher RV by conventional solid phase polymerization processes. Alternatively, the RV can be increased by other means such as by venting off water as the polymer is melted in the extruder prior to spinning.

Additives and modifiers may be added to the reaction mixture through inlet ports in the evaporator, the transfer line, or the autoclave. Modifiers, such as ethyleneoxide or propyleneoxide, can be used, for example, to modify polymer and/or fiber adhesion to other substrates, dyeability and RV (relative viscosity).

This allows for an in situ terminal primary amine modification, which in turn allows for the production of modified polyamides, for example. These modifiers are generally added at concentrations of about 0.01% to about 25% by weight, preferably between about 0.08% and 3% by weight, essentially all of which is incorporated into the polymeric product. The only essential characteristic of such a modifier is that it reacts with the amine group(s) to form a secondary amine, before the amine group reacts with an acid group to form an amide. A second embodiment is much like the first, except that instead of the modifier being added "neat", it is premixed with an amount of hexamethylenediamine adipate, for example, and then added to the reaction mixture at any of the points as detailed above. The final product is the same, but this embodiment allows for improved mixing and better control of added weights.

A third embodiment comprises contacting the modifier with hexamethylene diamine, which is then added to the acid (e.g., adipic acid) to form the salt.

The chemistry of this process for the in situ terminal primary amine modification is shown below where R1 and R2 are hydrogen, aliphatic, aromatic or alicyclic.

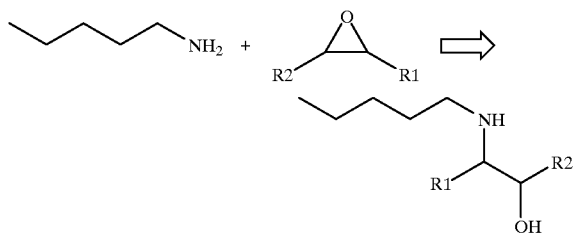

Generally the most preferred aromatics are substituted and unsubstituted C-6 (benzene), and the most preferred aliphatic are C-1 to C-12. Especially preferred is R1 and R2 both being hydrogen. The terminal amine could be part of a diamine monomer or a terminal amine group on a polymer/oligimer chain.

Selected epoxy containing molecules for use in the polymerization herein include but not limited to the following:

| | |
|---|---|
| Ethylene oxide | Propylene oxide |
| 1,2-Epoxybutane | 1,2-Epoxy-3-phenoxypropane |
| styreneoxide | |

The modifications described above can also be done in the presence of other additives which can produce other functions into the polyamides.

Polymerization

The modified terminal secondary amine, in turn, reacts with the diacid monomer or a terminal acid group on a polymer chain, additional diacid and diamine and/or lactams to produce the modified nylon polymer with substituted or unsubstituted 2-hydroxy-ethyl N- pendant group on a portion of the amide nitrogens and terminal amines

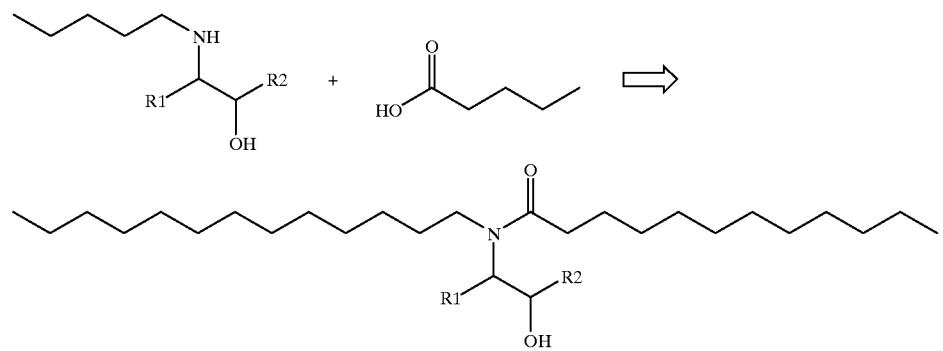

where R1 & R2 are hydrogen, aliphatic, aromatic or alicyclic. Generally the most preferred aromatics are substituted and unsubstituted C-6 (benzene), and the most preferred aliphatic are C-1 to C-12. Especially preferred is R1 and R2 both being hydrogen.

In the structures above, the ∿∿∿ sections is an aliphatic or aromatic moities represent the rest of the polymer chain containing one or more of the following elements, C, H, N, O, and S. The polyamides of the invention can be spun into fibers using conventional melt-spinning techniques. For instance, the polyamide(s) in flake form is (are) remelted, preferably using a screw melter type extruder. As known to those skilled in the art, other materials including other polyamides and/or pigments, can be added before or during the remelt process. It is not necessary, of course, to use this remelt step if a continuous polymerizer is employed to prepare the polyamides.

Following the formation of the homogeneous melt or melt-blend, the melt is typically pumped through a transfer line to a metering pump. The metering pump controls the volume of polymer delivered to an extrusion pack consisting of filtration media and spinneret plate. After filtration, the polymer melt, typically at a temperature about 20° C. to about 60° C. higher than the polymer melting point, is extruded through spinneret orifices into a quench chimney to form filaments that are cooled to a non-tacky state by a cross-flow of gaseous media, usually humidified chilled air of at least 50% relative humidity at 10° to 30° C. The filaments may alternatively be cooled by a radial quench unit.

The cooled filaments are converged, typically at the bottom of a quench drawer. A spin finish is applied to the converged filament bundle by using roll applicators or metered finish tip applicators. The filaments are pulled through the quench zone and over the finish applicators by a feeder roll.

Conventional processes and equipment may be used for drawing these fibers. These include both cold drawing at room temperature, hot drawing at 60–180° C., and both single-stage and multi-stage drawing processes. Some of these techniques are described in U.S. Pat. No. 4,612,150 (DeHowitt) and U.S. Pat. No. 3,311,691 (Good). Also, these modified polyamides can be used in a high speed spinning process without any mechanical draw to obtain high quality feed yarns for use in draw texturing and for warp-drawing.

Fibers of this invention can be engineered into essentially any form in which fibers are conventionally made, including, without limitation, filament yarns, staple fibers, monofilament, and strands. The fibers can be textured, bulked or crimped using well-known methods and can be colored using pigments or dyes. End-use applications for the fibers extend to all areas where polyamide fibers have been utilized, including, by way of example, apparel, carpets, rugs, upholstery, and industrial applications (tires, hoses, ropes, paper-making felts, etc.).

It will be appreciated that the inventive materials can also be used in films, engineering polymers and the like. Branched polyamides (nylons) may be used to enhance the relative viscosity (RV) of unbranched nylons, for use in high melt viscosity applications like blow molding. Branched nylon also generally has a higher number of amine and acid ends vs. linear polymers of the same viscosity. This high number of ends, as shown in the examples below, can be biased toward a higher amine count, thus giving a deeper dyeing product. Any end-use where high RV and high number of ends are desirable, would benefit from the use of these materials. Branched nylon also can be processed by thermoplastic processing methods to make finished articles. Such articles can be exposed to solid phase polymerization conditions (heat treatment) to increase the polymer RV to a point where the polymer does not flow and behaves like a thermoset polymer.

Analytical Test Methods

Relative viscosity (RV) was determined on solutions containing 8.40% by weight of the nylon polymers in 90.0% formic acid, based on ASTM Standard Test Method D789. Amine and carboxyl end groups were determined by methods similar to those described in the Encyclopedia of Industrial Chemical Analysis Vol. 17 John Wiley & Sons, New York 1973, p 293–294, which herein incorporated by reference.

Matrix Assisted Laser Desorption/Ionization (MALDI) mass spectroscopy measures the molecular weight of polymers and especially oligmers. These measurements are precise to less than one atomic weight unit and are used to determine the number of repeat units and ends. N-substituted nylon can be detected by measuring the polymer molecular weight. In addition to nylon standard peaks, additional peaks represent the additional weight of N-substituents on the amide are present. See McEwen, C. N.; Jackson, C.; Larsen, B. S. "Instrumental Effects in the Analysis of Polymers of Wide Polydispersity by MALDI Mass Spectrometry" Int. J. Mass Spectrom. and Ion Processes, 160, (1997), 387–394; Bahr, U.; Deppe, A.; Karas, M.; Hillenkamp, F.; and Giessman, U., Anal. Chem., 64, (1992), 908.

EXAMPLES

Examples 1 to 3 and Comparative Example A

For pure nylon 66 polymer, as RV increases the number of Amine ends and Acid ends decreases. In the following set of examples we demonstrate that by adding more propylene oxide to nylon 66 salt, the RV of the produced polymer is increased and also, the number of Amine ends and Acid ends increase.

Into a small autoclave set at 120° C. was added 59.07 gms of 51.5% aqueous solution of hexamethylenediamine/adipic acid salt (nylon salt),0.08 gms of hexamethylenediamine (HMD) and an amount of propylene oxide (PO). The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed. The polymer, amine and acid end equivalent per million grams of polymer where measured.

| Example | Salt (gm) | PO (gm) | Weight % Of PO§ | RV | Amine* | Acid* |
|---|---|---|---|---|---|---|
| Comp. A | 59.07 | Control | 0% | 42.7 | 51.2 | 78.0 |
| 1 | 59.07 | 0.08 | 0.26% | 42.9 | 88.3 | 106.7 |
| 2 | 59.07 | 0.15 | 0.49% | 47.1 | 108.2 | 113.1 |
| 3 | 59.07 | 0.30 | 0.99% | 57.9 | 157.0 | 134.7 |

§Weight % of pure PO to pure dry nylon salt
*units are in equivalents/million grains Examples 4 to 6 and Comparative Example B In the following set of examples we demonstrate that by adding more 1,2-epoxybutane to nylon 66 salt, the RV does not change much and the number of Amine ends and Acid ends increase.

Into a small autoclave set at 120° C. was added 59.07 gms of 51.5% aqueous solution of hexamethylenediamine/adipic acid salt (nylon salt), 0.08 gms of hexamethylenediamine (HMD) and an amount of 1,2-epoxybutane (BO). The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed. The polymer, amine and acid end equivalent per million grams of polymer where measured.

| Example | Salt (gm) | PO (gm) | Weight % Of PO§ | RV | Amine* | Acid* |
|---|---|---|---|---|---|---|
| Comp. A | 59.07 | Control | 0% | 39.3 | 74.2 | 75.6 |
| 1 | 59.07 | 0.20 | 0.66% | 33.0 | 128.4 | 62.5 |
| 2 | 59.07 | 0.99 | 3.23% | 32.7 | 179.7 | 148.9 |
| 3 | 59.07 | 1.99 | 6.57% | 33.8 | 201.7 | 174.4 |

§Weight % of pure BO to pure dry nylon salt
*units are in equivalents/million grains Examples 7 to 11

In the following set of examples we demonstrate that a small amount of ethyleneoxide is very effective in increasing nylon 66 RV. Also the amine ends count and acid ends count increase. The ethylene oxide is used as a concentrate in nylon 66 salt.

(Solution A): 1.6 gms of ethyleneoxide (EO) was added slowly to 57.6 gms of 80.7% aqueous solution of hexamethylenediamine. The solution was left over night. 48.46 gms of adipic acid and 87.71 gms of water were added to make an ethyleneoxide solution concentrate in nylon 66 salt. Into a small autoclave set at 120° C. was added 30 gms of 51.5% aqueous solution of hexamethylenediamine/adipic acid salt (nylon salt), 0.08 gms of hexamethylenediamine (HMD) and an amount of solution A. The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed. The polymer, amine and acid end equivalent per million grams of polymer where measured.

| Example | Salt (gm) | PO (gm) | Weight % Of PO§ | RV | Amine* | Acid* |
|---|---|---|---|---|---|---|
| 7 | 30.00 | 0.38 | 0.019% | 36.5 | 53.9 | 117.9 |
| 8 | 30.00 | 0.78 | 0.038% | 43.6 | 65.8 | 109.8 |
| 9 | 30.00 | 1.18 | 0.057% | 45.6 | 78.4 | 129.7 |
| 10 | 30.00 | 1.59 | 0.076% | 55.0 | 87.1 | 135.4 |
| 11 | 30.00 | 2.02 | 0.095% | 86.3 | 93.7 | 121.7 |

§Weight % of pure EO to pure dry nylon salt
*units are in equivalents/million grains

What is claimed is:

1. A process comprising contacting an epoxy containing modifier with a diamine/diacid salt and/or an amino-acid of a hydrolyzed lactam or lactam to form a polyamide.

2. A process comprising contacting an epoxy modifier with diamine, then contacting the resulting diamine with diacid and/or lactam to form a polyamide.

3. The process of claim 1 or 2 wherein the epoxy containing modifier is selected from the group consisting of

| Ethylene oxide | Propylene oxide |
|---|---|
| 1,2-Epoxybutane | 1,2-Epoxy-3-phenoxypropane |
| and styrene oxide. | |

4. The process claim 3 wherein the epoxy containing molecule is ethylene oxide.

5. The process claim 3 wherein the epoxy containing molecule is propylene oxide.

6. The process of claim 1, 2, 3 or 4 wherein the epoxy containing molecule is added at concentrations of 0.01% to 25% by weight.

7. The process of claim 1, 2, 3 or 4 wherein the epoxy containing molecule is added at concentrations of about 0.08% to 3% by weight.

8. The process of claim 1 or 2 wherein the polyamide polymer to be modified is selected from the group consisting of aliphatic polyamides, aromatic polyamides and and mixtures thereof.

9. The process of claim 8 wherein the aliphatic polyamide is nylon 6,6.

10. The process of claim 8 wherein the aliphatic polyamide is nylon 6.

11. The process of claim 1 or 2 wherein the polymer to be modified is an aromatic polyamide.

12. The process of claim 9 or 10 wherein the resulting product is a nylon composition having pendant substituted or unsubstituted 2-hydroxy-ethyl groups on about 0.1–5 percent of the amide nitrogens.

13. A polyamide having substituted or unsubstituted 2-hydroxy-ethyl groups pendant from the amide nitrogen.

14. The composition of claim 13 wherein the substituted or unsubstituted 2-hydroxy-ethyl groups is selected from the group consisting of:

| | |
|---|---|
| 1-ethan-2-ol | 1-propan-2-ol |
| 2-propan-1-ol | 1-butan-2-ol |
| 2-butan-1-ol | 1-propan-2-ol-3-phenoxy |
| 2-propan-1-ol-3-phenoxy | 1-ethan-2-ol-2-phenyl |
| and 1-ethan-2-ol-1-phenyl. | |

15. The composition of claim 13 or 14 wherein the modifier is present as 0.01% to 25% by weight.

16. The composition of claim 13 or 14 wherein the modifier is is present at concentrations of about 0.08% to 3% by weight.

17. The composition of claim 13 wherein the polyamide polymer modified is selected from the group consisting of aliphatic polyamides and aromatic polyamides and mixtures thereof.

18. The composition of claim 13 wherein the aliphatic polyamide is nylon 6,6.

19. The composition of claim 13 wherein the aliphatic polyamide is nylon 6.

20. The composition of claim 18 or 19 wherein pendant substituted or unsubstituted 2-hydroxy-ethyl groups are on about 0.1–3 percent of the amide nitrogens.

21. The composition of claim 13 wherein the substituted or unsubstituted 2-hydroxy-ethyl pendant from the amide nitrogen is reactive and acts as a branching point on the polymer chain.

22. The composition of claim 21 wherein said pendent group 1-ethan-2-ol.

23. The composition of claim 21 wherein said pendent group 1-propan-2-ol.

24. The composition of claim 21 wherein said pendent group 2-propan-1-ol.

* * * * *